(12) United States Patent
Werle et al.

(10) Patent No.: US 10,004,339 B2
(45) Date of Patent: Jun. 26, 2018

(54) ENTERTAINMENT DEVICE ACCESSORY

(71) Applicant: Sony Interactive Entertainment Inc., Tokyo (JP)

(72) Inventors: Michael Karl Werle, London (GB); David Uberti, London (GB)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days. days.

(21) Appl. No.: 15/403,846

(22) Filed: Jan. 11, 2017

(65) Prior Publication Data

US 2017/0202358 A1    Jul. 20, 2017

(30) Foreign Application Priority Data

Jan. 15, 2016    (GB) .................................. 1600782.5

(51) Int. Cl.
| | |
|---|---|
| *A47C 7/72* | (2006.01) |
| *A47C 3/18* | (2006.01) |
| *A47C 1/00* | (2006.01) |
| *H04N 13/04* | (2006.01) |

(52) U.S. Cl.
CPC .................. *A47C 7/72* (2013.01); *A47C 1/00* (2013.01); *A47C 3/18* (2013.01); *H04N 13/0402* (2013.01)

(58) Field of Classification Search
CPC .... A47C 7/72; A47C 3/18; A47C 1/00; H04N 13/0402
USPC ............................................ 297/217.3, 217.4
See application file for complete search history.

(56) References Cited

U.S. PATENT DOCUMENTS

| | | | | |
|---|---|---|---|---|
| 3,670,097 | A * | 6/1972 | Jones | G02B 27/017 348/211.99 |
| 4,868,888 | A * | 9/1989 | Dayton | H04R 5/023 297/217.4 |
| 5,695,406 | A | 12/1997 | Park | |
| 6,215,518 | B1 * | 4/2001 | Watkins | B60N 2/4876 297/217.4 X |
| 6,590,364 | B2 * | 7/2003 | Rogers, III | A47C 1/023 297/217.3 |
| 6,964,370 | B1 * | 11/2005 | Hagale | A47C 31/008 297/217.3 X |
| 7,134,719 | B2 * | 11/2006 | Moglin | A47C 7/72 297/217.3 X |
| 7,163,263 | B1 * | 1/2007 | Kurrasch | A47C 1/0242 297/217.3 |
| 7,188,896 | B2 * | 3/2007 | Embach | B60N 2/4876 297/217.4 X |

(Continued)

OTHER PUBLICATIONS

Search Report for corresponding GB application No. 1600782.5, 3 pages, dated Mar. 26, 2016.

(Continued)

*Primary Examiner* — Rodney B White

(74) *Attorney, Agent, or Firm* — Matthew B. Dernier, Esq.

(57) ABSTRACT

A chair for use with a head-mountable display device, the chair comprising a seat portion comprising one or more connection means to allow connection to the head-mountable display device, a base portion, and a rotatable connection between the seat portion and the base portion configured so as to allow an electrical connection to pass between the seat portion and base portion, wherein the electrical connection is operable to transmit at least one of power and digital data.

13 Claims, 5 Drawing Sheets

(56) References Cited

U.S. PATENT DOCUMENTS

| | | | | | |
|---|---|---|---|---|---|
| 7,393,053 | B2* | 7/2008 | Kurrasch | | A47C 1/0242 297/217.3 |
| 7,735,918 | B2* | 6/2010 | Beck | | A47C 1/0242 297/217.3 |
| 7,963,593 | B2* | 6/2011 | Mitchell | | A47B 21/06 297/217.3 X |
| 8,403,411 | B2* | 3/2013 | Boyer, Jr. | | B64D 11/06 297/217.3 |
| 8,596,716 | B1* | 12/2013 | Caruso | | A47C 31/126 297/217.3 X |
| 8,814,266 | B2* | 8/2014 | Guering | | B64D 11/06 297/217.4 X |
| 8,845,016 | B2* | 9/2014 | Domash | | A47C 7/72 297/217.4 X |
| 2002/0070590 | A1* | 6/2002 | Carstens | | A47C 3/18 297/217.3 |
| 2003/0057749 | A1* | 3/2003 | Buono | | B60N 2/44 297/217.3 |
| 2004/0021351 | A1* | 2/2004 | House | | B60N 2/44 297/217.4 |
| 2004/0195876 | A1* | 10/2004 | Huiban | | A47C 9/002 297/217.3 |
| 2008/0073953 | A1* | 3/2008 | Tamara | | A47C 7/72 297/217.4 |
| 2008/0246321 | A1* | 10/2008 | Canterbury | | A47C 9/022 297/217.4 |
| 2009/0206641 | A1* | 8/2009 | Brown, Jr. | | A47C 7/72 297/217.3 |
| 2010/0032999 | A1* | 2/2010 | Petitpierre | | B60N 2/0244 297/217.4 |
| 2011/0109134 | A1* | 5/2011 | Filipour | | A47C 7/72 297/217.4 |
| 2011/0109135 | A1* | 5/2011 | Davis, Jr. | | A47C 3/18 297/217.4 |
| 2011/0174926 | A1* | 7/2011 | Margis | | B60N 2/4876 297/217.3 X |
| 2012/0098945 | A1* | 4/2012 | McKiel, Jr. | | H04N 13/007 348/58 |
| 2012/0132746 | A1* | 5/2012 | Sizelove | | B64D 11/0015 297/217.3 X |
| 2013/0010053 | A1* | 1/2013 | Daddi | | A47C 31/00 297/217.3 X |
| 2013/0113249 | A1* | 5/2013 | Cvek | | A47C 31/00 297/217.3 X |
| 2016/0022047 | A1* | 1/2016 | Wu | | A47C 7/62 297/217.4 |
| 2016/0195921 | A1* | 7/2016 | Evans | | G06F 3/011 297/217.3 |

OTHER PUBLICATIONS

"Tunis: Revolutionary VR Seating & Movement Control & DIY PC", Wayback Machine, [online], Available from http://web.archive.org/web/201509171050 13/https://www.kickstarter.com/projects/840693394/turris-revolutionary-vr-seating-and-movement-contr 8 pages, Sep. 17, 2015.

* cited by examiner

ENTERTAINMENT DEVICE ACCESSORY

BACKGROUND OF THE INVENTION

Field of the Invention

The disclosure relates to an entertainment device accessory.

SUMMARY OF THE INVENTION

A head-mountable display (HMD) is an image or video display device which may be worn on the head or as part of a helmet. Either one eye or both eyes are provided with small electronic display devices. Such devices have become more popular in recent times as displays for use with entertainment systems. An example of such an entertainment system is the Sony® PlayStation 4®, with which an HMD may be used instead of, or in conjunction with, a television to display content. The display of such content is often performed with the objective of providing an immersive experience to a user, for example a virtual reality (VR) scenario in which a user is able to explore a computer-generated 3D environment.

With current technology it is desirable to provide an HMD with one or more cables to supply power, video content or other features in order to maintain performance levels of the HMD; for example, by omitting a supply of power, an HMD must carry a battery pack which typically has a short battery life (in order to reduce the weight) as well as potentially impacting a user's experience with the HMD due to additional weight and heat resulting from the use of the battery. Therefore HMDs may be dependent on the use of cables in order to provide an enjoyable experience for a user.

However, the use of cables to provide power and/or data to an HMD when in use is not without drawbacks. Users may risk becoming entangled in such cables, which has the potential to be a health hazard, and this may also risk either wires becoming disconnected or the entertainment device to which the HMD is connected being displaced by subsequent user motion. An example of an additional negative effect resulting from the use of cables is in the limited length of the cables; a user may be tethered to a location that is not the most convenient in the room due to concerns such as a long cable being heavy (and thus uncomfortable for the user as a portion of the weight is supported by the user's head) and a longer cable being associated with an increased risk of entanglement. As is readily apparent, in all but the most obscure applications becoming entangled in a cable will impede the immersion of a user within a VR experience.

Each of these factors has the potential to disrupt a user's experience with the HMD and thus it would be advantageous to provide an arrangement in which these drawbacks, amongst others, may be addressed or mitigated.

This disclosure is defined by claim 1.

Further respective aspects and features of the disclosure are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
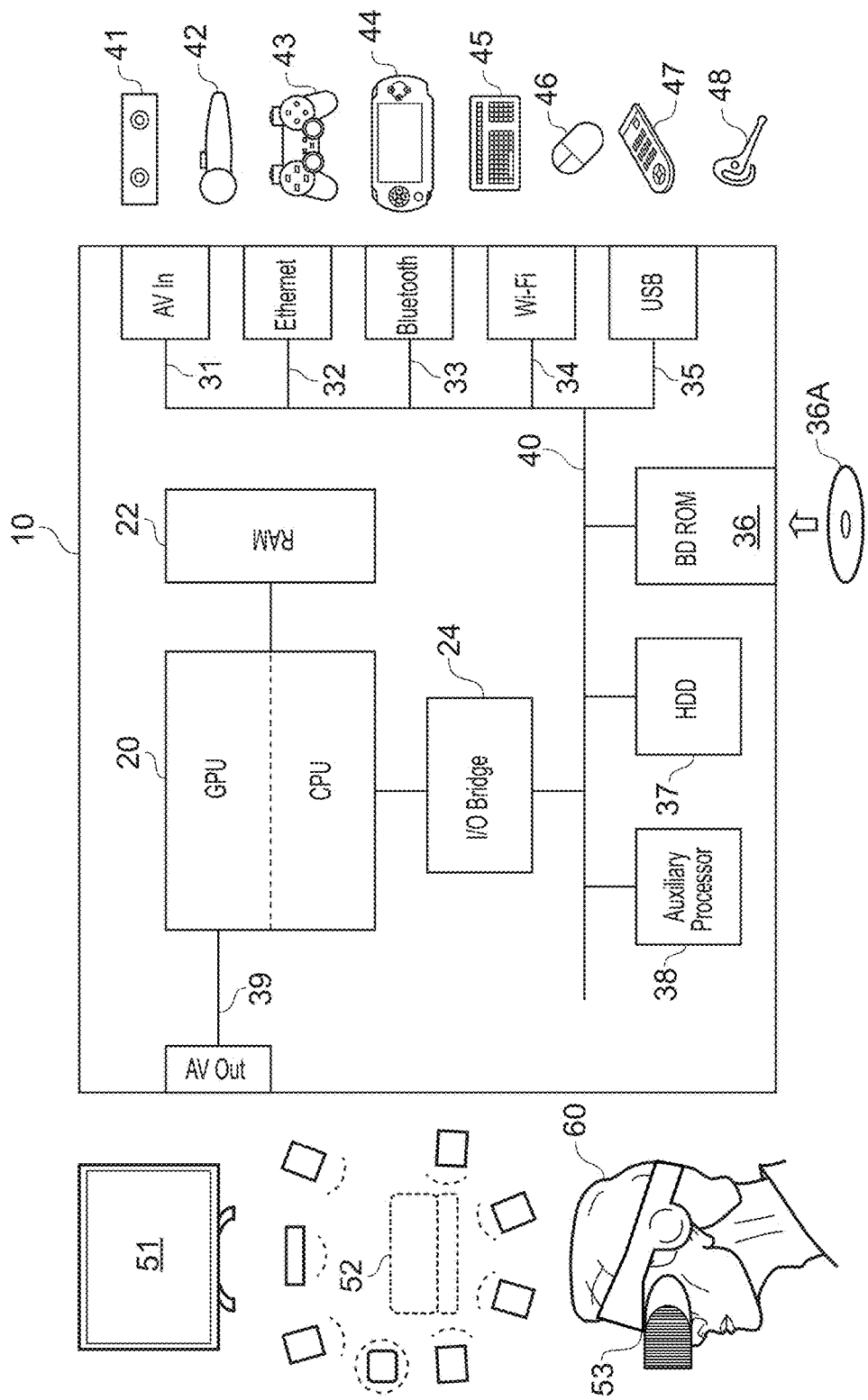
FIG. 1 schematically illustrates an entertainment device.

Referring now to the drawings, wherein like reference numerals designate identical or corresponding parts throughout the several views, FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Figure 2:
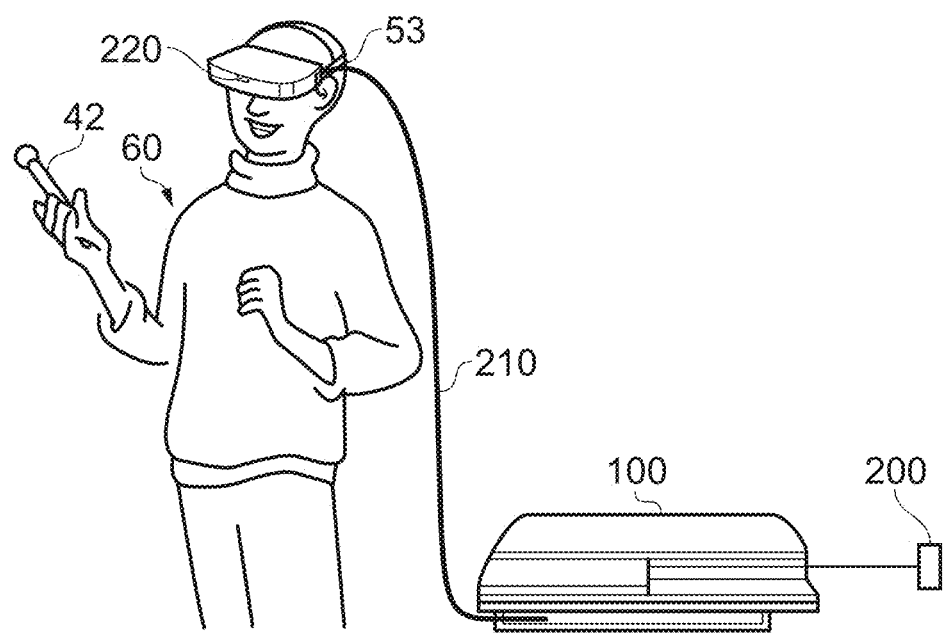
FIG. 2 schematically illustrates an HMD system in use.

FIG. 2 schematically illustrates a user wearing an HMD connected to a Sony® PlayStation 3® games console 100 as an example of a base device (corresponding to the system unit 10 of FIG. 1), a further example of a base device is the PlayStation 4® games console described previously herein. The games console/base device 100 is connected to a mains power supply 200 and (optionally) to a main display screen (not shown). A cable 210 acting as both power supply and signal cables links the HMD 53 to the games console 100 and is, for example, plugged into a USB socket, HDMI socket and/or proprietary socket on the console 2000. In FIG. 2, the user is also shown holding a hand-held controller 42 which corresponds to the Sony® Move® controller, as described with reference to FIG. 1, which communicates wirelessly with the games console 100 to control (or to contribute to the control of) game operations relating to a currently executed game program. Of course, other hand-held controllers could be used in place of the hand-held controller 42, or in addition to it.

The video displays in the HMD 53 are arranged to display images generated by the games console 100, and earpieces may be provided in the HMD 53 and arranged to reproduce audio signals generated by the games console 100. These signals may be in digital form when they reach the HMD 53, such that the HMD 53 comprises a digital to analogue converter (DAC) to convert at least the audio signals back into an analogue form for reproduction.

Images from the camera 220 mounted on the HMD 53 are passed back to the games console 100 via the cable 210. Similarly, if motion or other sensors are provided at the HMD 53, signals from those sensors may be at least partially processed at the HMD 53 and/or may be at least partially processed at the games console 100. The use and processing of such signals will be described further below.

Each connection from the games console 100 may also provide power to the HMD 53, for example according to the USB standard.

Figure 3:
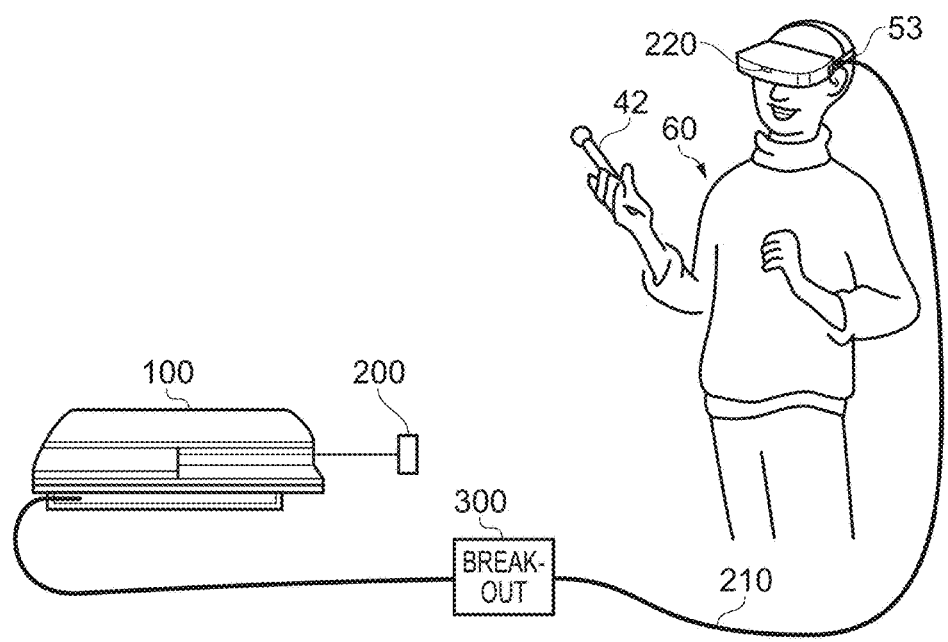
FIG. 3 schematically illustrates an alternative HMD system in use.

FIG. 3 schematically illustrates a similar arrangement in which the games console is connected (by a wired or wireless link) to a so-called "break out box" acting as a base or intermediate device 300, to which the HMD 53 is connected by a cabled link 210. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 300 is fixed to the ground or to a piece of furniture, but rather than having a very long trailing cable from the games console 100, the break-out box provides a locally weighted point so that the cable 210 linking the HMD 53 to the break-out box will tend to move around the position of the break-out box. This can improve user safety and comfort by reducing the use of very long trailing cables.

Figure 4A:
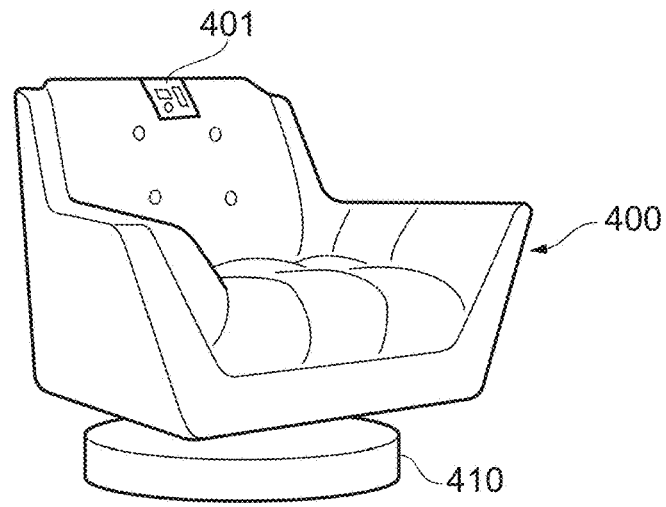
FIGS. 4a and 4b schematically illustrate chairs according to the present disclosure.
Figure 4B:
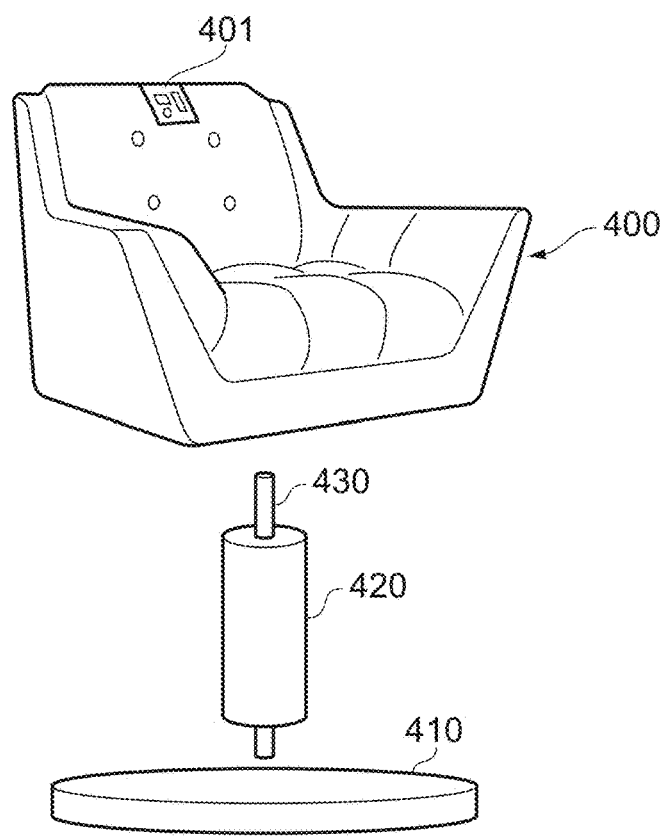

FIGS. 4a and 4b schematically illustrate an entertainment device accessory according to the present disclosure.

FIG. 4a illustrates a chair that comprises a seat portion 400 and a base portion 410. It would be apparent to the skilled person that the illustrated form of the chair is merely an exemplary design, as it is well known that both the seat portions and base portions of chairs may vary; for example, an alternative base could be a spoked design in which each leg extends from a central shaft that connects the two portions.

The seat portion 400 comprises one or more sockets as part of a panel 410 to allow connection to a head-mountable display device. The panel 410 provides ports for cable inputs, for example HDMI, USB and/or proprietary ports, such that one or more devices such as HMDs may be connected. The panel 410 may be provided in forms other than that shown, for example the sockets could be inset into the seat cushion such that cables are able to be plugged in but a user is not made uncomfortable if they rest against the area where the sockets are located when the sockets are not in use.

Further ports may be provided, and the location of the ports is free to be modified; for example, it may be more convenient to have the ports provided on the arm of the seat portion 400 or a plurality of panels may be provided that offer ports in several locations about the chair. This could be advantageous when using a number of peripherals in conjunction with the chair, for example an HMD could connect to ports about the headrest while controllers or other peripherals could use ports located on the arms of the chair (either for connectivity or power supply, for example).

FIG. 4b illustrates the same chair in an exploded view. This shows a connecting portion 420, the size and appearance of which is able to be selected freely by the skilled person so long as the function of providing support for the seat is maintained. This connecting portion 420 (with the appropriate joining method to the base portion 410 and seat portion 400) is an example of a rotatable connection between the seat portion 400 and the base portion 410 so as to allow the seat portion to rotate relative to the base portion, and to allow an electrical connection to pass between the seat portion and base portion. The rotatable electrical connection is operable to transmit at least one of power and digital data, and any appropriate configuration of the rotatable electrical connection that provides this functionality may be considered appropriate; in the below example we consider a cable as being an example of such a rotatable electrical connection. Alternatively, an electrical swivel connector or rotary electrical connector may be appropriate for use in the present arrangement.

Where the rotatable electrical connection takes the form of one or more cables, it may optionally have a predetermined amount of slack relative to the length of the tubular connecting portion 420. In any event, it may twist by at least a predetermined number of rotations in either direction (integer or fractional, as chosen by a designer), thereby enabling a user to rotate freely within this range. Optionally in this case the chair comprises a bias to return to a middle position, for example by having a slight helical ramp within the rotational mounting of the chair so that rotating left or right slightly raises the seat on this ramp; in the absence of a restraining force, the chair will then rotate back to the middle position so that twists of the cable(s) do not accumulate during successive uses. Other biasing means will be apparent to the skilled person.

Meanwhile a swivel or rotary connector may comprise concentric tracks and corresponding contacts for power and/or data lines between the base and the rotating seat portion; alternatively or in addition such a connector may comprise a columnar sequence of tracks and corresponding contacts for power and/or data lines between the base and the rotating seat portion.

In any of the above cases, the rotatable electrical connection may adhere to any standards imposed upon the or each data or power cable that the electrical connector is bridging.

Instead of, or in addition to, the rotatable electrical connection as described above, a wireless communication arrangement may be provided to allow for data to be transmitted between the base portion 410 and the seat portion 400. Such an arrangement may simplify the construction of the chair, as the number of cables or other connections used for communication between the two portions may be reduced.

It will be appreciated that high-quality stereoscopic video data typically has a high data bandwidth; meanwhile the distance between transmitter and receiver needed to accommodate free rotation of the base and chair can be small; for example in the order of tens of centimeters or less than 10 cm. Consequently any wireless communication protocol suitable for such high bandwidth, short-range data transmission may be chosen.

Digital data, as described above, may comprise stereoscopic video data although it is not limited to this; for example, the digital data may comprise instructions for controlling aspects of the chair or an associated HMD. Generally the chair is operable to receive digital data from an external device, although it is possible that some or all of the digital data may be generated by a processing unit that forms a part of the chair. The chair may also be operable to transmit data to an external device; an example of this is providing input data (for example, an orientation of the chair) to the entertainment device.

In the example of the tubular connecting portion 420, the connecting portion 420 is hollow so as to allow at least a cable 430 to pass from the base portion 410 to the seat portion 400, either directly or via a separate rotatable electrical connection or wireless link, as described above. The cable 430 provides functionality to the chair, as it may provide a link between the ports of the panel 410 and an external feature, such as a games console 100 or a power supply. This cable may therefore enable to the transfer of at least one of data or power to a device, such as an HMD, that is plugged into one of the ports of the panel 401.

It is anticipated that the connecting portion 420 and/or the method of attachment (such as the rotatable connector described above) between the connecting portion 420 and the seat portion 400 may be designed to either remain stationary and limit the motion of the seat portion 400, or to allow any range of motion; for example, a rotatable connection may be configured to allow the seat portion 400 to tilt relative to the base portion 410 as well as provide a full 360° rotation of the seat portion 400 relative to the base portion 410, or a limited range of rotational motion, such as 90°, and no tilt being possible. Any combination of these features of motion may be possible, as would be understood by the skilled person.

By providing such a range of motion, a user is more fully able to appreciate a virtual environment that is displayed by the HMD as they will be able to look around; for example, in a virtual journey in a vehicle a user will be able to rotate a chair 90° to the appropriate side in order to look directly out of a window instead of towards the front of the vehicle. If this motion were attempted in a completely stationary chair, it would require a severe rotation of the user's neck which may be uncomfortable.

The rotational or tilting motion of the chair may also be used to complement a feeling of immersion during a game, as the connection between the connecting portion 420 and the seat portion 400 may be provided with an electronic motor as a part of the arrangement. For example, the rotatable connection may be biased by a motor so as to inhibit or promote rotational motion of the chair. Such a motor may be controlled to apply a bias to the motion of the chair so as to either encourage a user to move in a particular direction (such as by causing the chair to rotate in a certain direction) or to oppose a motion of the chair. A similar provision for the tilt of the chair could be made. An example of an application of such a feature would be in a VR flight simulation; at take-off the chair could be caused to tilt backwards so as to simulate the motion that would be expected from a user's prior experience of flying.

Users of an HMD are often required to stand in order to achieve a full range of motion to fully experience a VR environment, but this may become tiring. Sitting down while playing may be considered detrimental to the user's experience, as it reduces the possible motion of the user to head motions or very small rotations of the body. The provision of a chair that is configured to provide rotational and tilting motion may therefore provide a more comfortable VR experience for users without reducing the range of motion of the user significantly. The presently disclosed arrangement provides an advantage over the use of a different chair that may provide the same range of motion in that any cables from the HMD are plugged into the chair, and thus the risk of tangling or the cable becoming a health risk, particularly when the user rotates within the chair, is significantly reduced.

By providing the ports as a part of the panel 401 as an interface between either an external device or a power source (or both) and an HMD, the use of cables running directly from the HMD to an external device or power source may be reduced.

Figure 5:
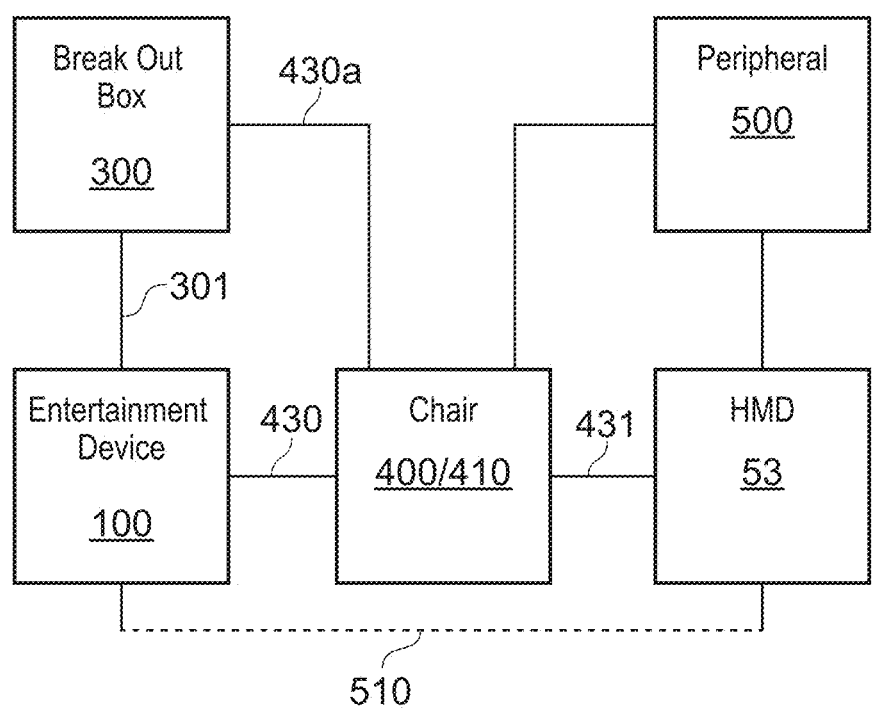
FIG. 5 schematically illustrates a system comprising a chair according to the present disclosure.

FIG. 5 schematically illustrates an example of a system in which both power and digital data are transmitted from a console 100 to an HMD 53. The console 100 provides the video data and power to the panel 401 of the chair via the cable 430. Alternatively, the data and power are provided via a breakout box 300 using the connections 301 and 430a. A cable 431 is provided that transmits the data and power from the panel 401, via the ports, to the HMD 53. It is also envisaged that the chair may be connected to an external power source (not pictured) so as to be able to provide power to the chair from a source other than the entertainment device.

Further peripherals 500 such as the controller 42 may also connect to the chair, for example to receive power.

The HMD 53 may also receive data from the console 100 via a wireless link 510 (for example having a range in the order of meters or tens or meters), and this may be more desirable than in earlier arrangements as wireless transmission/reception of data becomes more appropriate in a system if the HMD has a constant power supply due to the mitigation of the problem of batteries being drained too quickly. Any suitable wireless protocol able to accommodate the data bandwidth over the desired range may be considered.

Due to the potentially stationary nature of the base portion 410 of the chair, cables may be routed from a device such as the console 100 to the chair in a manner such that there is less of an obstruction caused by the cables. For example, if the chair were to be situated near a wall cables could be routed about the skirting board and then plugged into the base of the chair. This reduces a trip hazard, as well as providing a more aesthetically pleasing arrangement.

In embodiments, wires from the panel 401 to the HMD 53 may be replaced or supplemented with a wireless connection (for example having a range in the order of a meter or meters), with the chair comprising a wireless communication module for communicating with the HMD. Having a short range wireless connection reduces the power requirements of communication, and therefore even a battery-powered HMD may benefit from the provision of an apparatus according the present disclosure as the power requirements placed on the HMD for such a communication are reduced.

The same wireless communication module, or an additional wireless communication module, may be used to communicate with the entertainment device to allow for the transmission and reception of digital data (such as stereoscopic video data or controller inputs) or with a further external device that is not used for the provision of content to a user of the head-mountable display device; an example of such an external device is a mobile phone that could be used to interact with the chair, or the entertainment device via the chair.

A number of features may be provided to further assist the chair in providing a more immersive VR experience or an improved interaction with the user. Examples of a number of such features are described below.

Many HMDs may make use of a pair of headphones to provide audio to a user, as this may be beneficial for reducing noise from external sources and thus mitigates the problem of external noises breaking the sense of immersion experienced by a user. In some cases however, this may be undesirable; for example, it is anticipated that some games can be played by multiple players even if only one has an HMD (other players may make use of an alternative display) and as such communication may be important and so external noise reduction is not desired. A further example is that of when a user would like to be able to be disturbed when their attention may be required. In such a case, the provision of speakers in the chair may be a suitable alternative.

The speakers may be provided about the headrest of the chair, or any other suitable location on the chair; for example, the arms of the chair may be provided with speakers so as to provide a surround sound experience. The speakers may be controlled directly by data supplied to the chair from the entertainment device providing data to the HMD, or the HMD may be configured to supply audio data (from the input data) back to the chair in order to generate an audio output.

A headrest portion of the chair (or indeed any other portion of the chair) may be configured to allow the storage of an HMD or any other peripheral. An example of this is that the headrest could be hollow, and the headrest would comprise a slot or openable portion that could be used to insert the HMD. This hollow portion could also be provided with means to allow the HMD to be charged while stored. Alternatively another portion of the chair, such as the base, may comprise a hollow portion to allow for storage of an HMD or other peripheral.

It is also envisaged that a portion of the chair may comprise a 'doorbell', which is an example of an alert button which is operable to cause the generation of an audio or visual notification to a user of the associated head-mountable display device. By pressing this button, the user of the HMD is caused to hear a sound or be presented with an image that alerts them to the use of the button. This may be less of a shock to the user than being tapped on the shoulder, for example, as such an action would likely not correspond to any event occurring in the virtual reality environment and the disparity in the virtual reality events and a real world interaction may be rather jarring to a user. This would also be more effective than trying to talk to the user if they are using headphones, as external sound sources would be largely blocked out by their use. Such a button could be provided on the back of the headrest, for easy access by another person, or at any other position on the chair—the arm of the chair may be more convenient in the case that the chair is located with its back to a wall. The chair could also be equipped with wireless capabilities such that another person with a corresponding wireless device (such as a mobile device configured to communicate with the chair) could provide the same function without a physical button press.

The seat of the chair may also be used to provide functionality to the chair, such as a seat portion comprising a pressure pad. This could be used to determine that the seat is in use (for example, a binary 'pressure detected' or 'pressure not detected' use case) or it could be used to measure the weight of a person using the chair. This information could be used in a number of ways, for example to identify a user when selecting a profile or simply that a user is seated and ready to proceed with interaction with the associated entertainment device. Alternatively, the detection of the pressure could be used as an input itself—an in-game function could be assigned to the action of a user standing up, for example pausing gameplay until the user resumes sitting, or a user could vary the pressure they exert on the chair (and therefore the pressure pad) by pushing on the arms of the chair to either raise or lower themselves in order to provide an input.

Portions of the chair may also be interchangeable with other portions that provide different functionality. For example, a pair of bases could be selected from for use with the chair; one could provide storage space by having a hollow interior that is accessible, while the other could be provided with foot pedals that are located upon the legs of the chair so as to provide a greater number of inputs to a user. The example of foot pedals being provided is particularly useful for car simulators, for example. Any combination of appropriate functions may be provided by the selection of a base, and the chair may be configured to facilitate the changing of an attached base for an alternative base. A base comprising foot pedals is an example of a chair that comprises an input section associated with the base portion, the input section allowing a user to provide inputs that are transmitted to an external device The arms of the chair may also be interchangeable, for example to improve functionality of the chair or the comfort of the user. A first example of such an implementation is a chair that is provided with two arms, one of which comprises buttons to allow for user inputs. The arms could each be provided with connectors on both the left hand side and the right hand side of the arm such that the arms can be switched. This allows for a left-handed and right-handed arrangement of the arms, so that the buttons are easily accessible no matter which side the user prefers.

A second example is of the provision of arms that comprise different functions. Arms may be provided that may replace either arm (or indeed pairs may replace both) and allow the chair to offer a greater number of ports for connectivity, for example. Different arms may also have different controls; for example they may have no buttons, a directional pad (d-pad) and a pair of buttons to facilitate navigation of menus on the entertainment device, or a joystick. These exemplary configurations are examples of a chair that comprises an arm portion that includes an input section that allows a user to provide inputs that are transmitted to an external device.

Further examples of arms include those with a hollow portion for storage, different colours, different materials or different (or adjustable) heights. These examples of different considerations when providing arms may be used in any combination, as arms used with the chair may comprise any number of these features or other features.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A chair for use with a head-mountable display device, the chair comprising:
    a seat portion comprising one or more connection means to allow connection to the head-mountable display device;
    a base portion; and
    a rotatable connection between the seat portion and the base portion configured so as to allow the seat portion to rotate relative to the base portion and to allow an electrical connection to pass between the base portion and seat portion; and
    an alert button which is operable to cause the generation of an audio or visual notification to a user of the associated head-mountable display device,
    wherein the electrical connection is operable to transmit at least one of power and digital data.

2. The chair according to claim 1, wherein the rotatable connection is also configured to allow the seat portion to tilt relative to the base portion.

3. The chair according to claim 1, wherein the rotatable connection may be biased by a motor so as to inhibit or promote rotational motion of the chair.

4. The chair according to claim 1, wherein at least one of the connection means and the rotatable connection comprise at least one of HDMI and USB connections.

5. The chair according to claim 1, wherein the base portion of the chair is connectable to an external power source.

6. The chair according to claim 1, wherein the chair is operable to receive digital data from one or more selected from the list consisting of:
    (i) an entertainment device used for the provision of content to a user of the head-mountable display device; and
    (ii) an external device not used for the provision of content to a user of the head-mountable display device.

7. The chair according to claim 6, wherein the digital data comprises stereoscopic video data.

8. The chair according to claim 1, wherein the chair is operable to transmit data to one or more selected from the list consisting of:
    (i) an entertainment device used for the provision of content to a user of the head-mountable display device; and
    (ii) an external device not used for the provision of content to a user of the head-mountable display device.

9. The chair according to claim 8, comprising an arm portion that includes an input section that allows a user to provide inputs for subsequent transmission.

10. The chair according to claim 8, comprising an input section associated with the base portion, the input section allowing a user to provide inputs for subsequent transmission.

11. The chair according to claim 1, wherein the seat portion comprises a pressure pad.

12. The chair according to claim 1, comprising a wireless communication module for communicating with at least one of:
    an entertainment device used for the provision of content to a user of the head-mountable display device;
    the head-mountable display device; and
    an external device not used for the provision of content to a user of the head-mountable display device.

13. A system for providing audio-visual content to a user, the system comprising:
    an entertainment device;
    a head-mountable display device; and
    a chair, including:
    a seat portion comprising one or more connection means to allow connection to the head-mountable display device;
    a base portion; and
    a rotatable connection between the seat portion and the base portion configured so as to allow the seat portion to rotate relative to the base portion and to allow an electrical connection to pass between the base portion and seat portion; and
    an alert button which is operable to cause the generation of an audio or visual notification to a user of the associated head-mountable display device,
    wherein the electrical connection is operable to transmit at least one of power and digital data.

* * * * *